(12) United States Patent
Kobayashi et al.

(10) Patent No.: US 8,714,591 B1
(45) Date of Patent: May 6, 2014

(54) VEHICLES, NET ASSEMBLIES, AND CLAMPERS THEREFOR

(71) Applicant: Honda Motor Co., Ltd., Tokyo (JP)

(72) Inventors: Takeshi Kobayashi, Bellefontaine, OH (US); Hiromitsu Shiina, Dublin, OH (US); Tsuyoshi Kumasaka, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/760,178

(22) Filed: Feb. 6, 2013

(51) Int. Cl.
*B60R 21/06* (2006.01)
*F16L 3/10* (2006.01)

(52) U.S. Cl.
USPC ............ 280/749; 248/72; 248/74.4; 403/196; 403/344

(58) Field of Classification Search
CPC ........ B60R 21/06; B60R 21/08; B60R 21/11; B60R 21/13; B60R 21/131; B60R 2021/0018; B60R 2021/0074; B60R 2021/0076; B60R 2021/0079; B60R 2021/0081; B60R 2021/06; B60R 2021/13; B60R 2021/137; F16D 1/06; F16D 1/076; E06B 9/56; E06B 11/021; E04G 21/3266; F16L 3/10; F16L 3/1008; F16L 3/1025; F16L 3/1033; F16L 3/1075; F16B 2/10
USPC ...................... 280/749, 756; 180/89.1, 89.12; 403/192, 196, 289, 344; 256/42, 45, 256/54; 296/180.1, 85; 160/327, 328, 3, 54, 160/368.1; 248/71, 72, 74.1–74.5; 24/16 PB, 23 B, 20 EE, 487; 285/373, 285/419, 420, 61, 305, 921
See application file for complete search history.

(56) References Cited

U.S. PATENT DOCUMENTS

| | | | | |
|---|---|---|---|---|
| 2,338,006 | A * | 12/1943 | Morehouse | 248/74.3 |
| 3,061,253 | A * | 10/1962 | Keaton | 248/74.1 |
| 3,525,535 | A * | 8/1970 | Yasusaburo | 280/749 |
| 3,695,698 | A * | 10/1972 | Trump | 297/487 |
| 3,817,564 | A | 6/1974 | Baldwin et al. | |
| 4,478,381 | A | 10/1984 | Pittion et al. | |
| 5,026,360 | A | 6/1991 | Johnsen et al. | |
| 5,129,608 | A | 7/1992 | Goldman | |
| 5,494,245 | A | 2/1996 | Suzuki et al. | |
| 5,865,476 | A | 2/1999 | Kramer | |
| 5,873,144 | A * | 2/1999 | Tupper et al. | 16/18 CG |
| 6,502,859 | B1 * | 1/2003 | Svetlik | 280/749 |
| 6,505,880 | B1 * | 1/2003 | Castro | 296/102 |
| 6,595,567 | B1 * | 7/2003 | Ament et al. | 296/24.43 |
| 6,626,462 | B2 | 9/2003 | Saczalski et al. | |
| 6,682,026 | B2 | 1/2004 | Nagayasu | |
| 7,114,686 | B2 | 10/2006 | Andrigo | |
| 7,223,256 | B2 * | 5/2007 | Bierman | 604/174 |
| 7,392,569 | B2 | 7/2008 | Sharkey et al. | |
| 7,578,544 | B1 * | 8/2009 | Shimamura et al. | 296/183.2 |
| 7,661,631 | B2 | 2/2010 | Ibaraki | |
| 7,712,708 | B2 | 5/2010 | Clark | |
| 8,123,279 | B2 | 2/2012 | Orr et al. | |
| 8,282,048 | B2 | 10/2012 | Nguyen et al. | |

(Continued)

*Primary Examiner* — Paul N Dickson
*Assistant Examiner* — Laura Freedman
(74) *Attorney, Agent, or Firm* — Ulmer & Berne LLP

(57) ABSTRACT

A clamper includes a living hinge, a first end portion, and a second end portion. The first end portion includes a first buckle portion. The second end portion includes a second buckle portion. The first end portion and the second end portion are configured for engagement with one another in confronting relationship. Net assemblies and vehicles are also provided.

18 Claims, 7 Drawing Sheets

(56) References Cited

U.S. PATENT DOCUMENTS

| | | |
|---|---|---|
| 8,292,352 B2 | 10/2012 | Furman et al. |
| 8,308,223 B2 | 11/2012 | King |
| 8,328,235 B2 | 12/2012 | Schneider et al. |
| 8,376,441 B2 * | 2/2013 | Nakamura et al. ......... 296/65.01 |
| 8,465,050 B1 * | 6/2013 | Spindler et al. ............... 280/749 |
| 8,550,500 B2 * | 10/2013 | Yamamoto et al. ........... 280/807 |
| 2011/0241325 A1 | 10/2011 | King et al. |
| 2012/0112016 A1 | 5/2012 | Blanchard et al. |
| 2012/0132761 A1 | 5/2012 | Elsmore et al. |

* cited by examiner

VEHICLES, NET ASSEMBLIES, AND CLAMPERS THEREFOR

TECHNICAL FIELD

Disclosed herein are vehicles, net assemblies, and clampers therefor.

BACKGROUND

Some conventional utility vehicles include a roll cage which assists in protecting properly seated and secured operators during a rollover situation or a situation involving a significant lateral incline of the vehicle.

SUMMARY

In accordance with one embodiment, a clamper comprises a first arcuate portion, a second arcuate portion, a living hinge, a first end portion, and a second end portion. The living hinge connects the first arcuate portion and the second arcuate portion. The first end portion extends away from the first arcuate portion and comprises a first buckle portion. The second end portion extends away from the second arcuate portion and comprises a second buckle portion. The first end portion and the second end portion are configured for engagement with one another in confronting relationship.

In accordance with another embodiment, a net assembly comprises a net structure and at least one clamper. The net structure comprises a mesh structure, a reinforcement structure attached to the mesh structure, and at least one attachment member attached to the reinforcement structure. For each of the at least one clamper, the clamper comprises a first arcuate portion, a second arcuate portion, a living hinge connecting the first arcuate portion and the second arcuate portion, a first end portion extending away from the first arcuate portion, and a second end portion extending away from the second arcuate portion. The first end portion comprises a first buckle portion. The second end portion comprises a second buckle portion. The first end portion and the second end portion are configured for engagement with one another in confronting relationship and for engaging a respective one of the at least one attachment member.

In accordance with yet another embodiment, a vehicle comprises a seat, a roll cage, a net structure, and at least one clamper. The seat is configured to support an operator of the vehicle. The roll cage at least partially defines a protected area and at least partially defines an access opening communicating with the protected area. The seat is positioned within the protected area. The roll cage comprises a tubular member. The net structure comprises a mesh structure, a reinforcement structure attached to the mesh structure, and at least one attachment member attached to the reinforcement structure. The at least one clamper is attached to the tubular member. For each of the at least one clamper, the clamper comprises a first roll cage engagement portion, a second roll cage engagement portion, a living hinge connecting the first roll cage engagement portion and the second roll cage engagement portion, a first end portion extending away from the first roll cage engagement portion, and a second end portion extending away from the second roll cage engagement portion. The first end portion comprises a first buckle portion. The second end portion comprises a second buckle portion. The first end portion and the second end portion are configured for engagement with one another in confronting relationship such that the first roll cage engagement portion and the second roll cage engagement portion cooperate with one another to at least substantially entirely surround the tubular member. The first buckle portion and the second buckle portion engage at least one of the at least one attachment member of the net structure. The net structure is selectively configurable in a closed configuration to at least inhibit passage of an operator of the vehicle through the access opening.

BRIEF DESCRIPTION OF THE DRAWINGS

Various embodiments will become better understood with regard to the following description, appended claims and accompanying drawings wherein:

DETAILED DESCRIPTION

Figure 1:
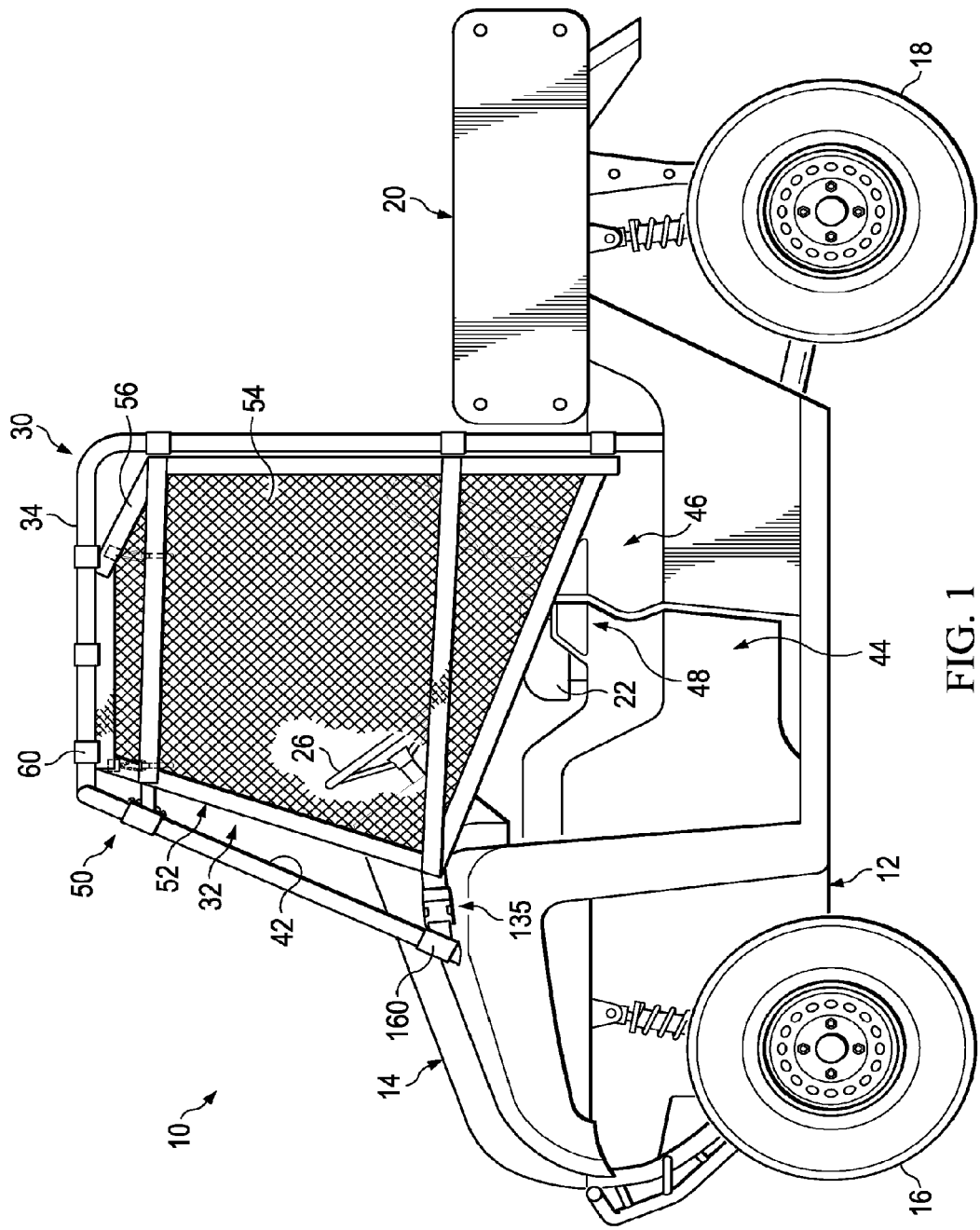
FIG. 1 is side elevational view generally depicting a multi-use vehicle ("MUV") having a net assembly in accordance with one embodiment.

Certain embodiments are hereinafter described in detail in connection with the views and examples of FIGS. 1-7. FIG. 1 illustrates a vehicle 10 that can include a frame, indicated generally at 12, and a body 14 supported by frame 12. Vehicle 10 can further include a pair of front wheels 16 and a pair of rear wheels 18. The wheels 16 and 18 can be suspended from frame 12 and can be rotatable relative to frame 12. Vehicle 10 can also include a source of motive power (not shown), which can be an internal combustion engine and/or one or more electric motors, and a drivetrain (not shown) for transferring torque from the source of motive power to the rear wheels 18 and/or the front wheels 16.

Vehicle 10 is shown to be a utility-type vehicle that can include a utility bed 20 that can be fixed with respect to the body 14, or that can be selectively pivotable as a dump-type bed. The utility bed 20 can be configured to support cargo and/or passengers for transportation by the vehicle 10. Vehicle 10 can further include a seat 22 that can be supported by the frame 12 and/or body 14, and that can be configured to support an operator (not shown). Seat 22 can be a bucket-type seat or a bench-type seat. Vehicle 10 can also include a steering wheel 26 that can be coupled to the front wheels 16. By turning the steering wheel 26, it will be appreciated that an operator can effect steering of the vehicle 10.

Vehicle 10 can include a roll cage 30 which can be attached to, and supported by, the frame 12 and/or body 14 of vehicle 10. The roll cage 30 can at least partially define a protected area, indicated generally at 32. Seat 22 can be positioned within the protected area 32, such that an operator of vehicle 10 can be located within the protected area 32 when seated upon seat 22 during operation of vehicle 10. In one embodiment, as shown in FIG. 1, it will be appreciated that the utility bed 20 might not be provided within the protected area 32. As such, it will be appreciated that cargo and/or persons supported by seats or a cargo floor in the utility bed might not be provided within the protected area 32. However, in other embodiments, a utility bed and/or cargo and/or persons supported by a utility bed might reside within a protected area at least partially defined by a roll cage of a vehicle. In still other embodiments, a vehicle incorporating a roll cage might not include a utility bed.

The roll cage 30 can include one or more tubular members (e.g., 34) that are attached to the frame 12 and/or the body 14 of vehicle 10. The tubular members (e.g., 34) can have any of a variety of suitable configurations. In one embodiment, the tubular members can be generally cylindrical and can have a hollow interior. In other embodiments, roll cages can be provided that include generally cylindrical, solid tubular members. In still other embodiments, roll cages can be provided with tubular members having a variety of alternative shapes, e.g., tubular members having generally square or generally rectangular cross-sectional shapes.

Roll cage 30 can at least partially define one or more access openings. For example, roll cage 30 can at least partially define an access opening 42 that communicates with the protected area 32 and is on the left side of vehicle 10. The roll cage 30 can at least partially define a similar access opening on the right side of the vehicle 10 that communicates with the protected area 32. The tubular members (e.g., 34) of the roll cage 30 can cooperate to at least partially define the access opening 42. An operator of vehicle 10 can pass through the access opening 42 into the protected area 32 when boarding the vehicle 10, and can pass from the protected area 32 through the access opening 42 when exiting the vehicle 10.

Any of a variety of other features of a vehicle can cooperate with roll cage 30 to define an access opening to a protected area, such as the access opening 42 that communicates with the protected area 32. For example, in the embodiment illustrated in FIG. 1, the roll cage 30 is shown to cooperate with a door 44 and a stationary portion 46 of body 14 to define the access opening 42. In one embodiment, a forward end of the door 44 can be hingedly attached to body 14 and/or frame 12 such that the door 44 can swing between open and closed positions. A door latch assembly can be provided (e.g., in the vicinity indicated generally at 48) for selective use by an operator to selectively lock a rearward or swinging end of the door 44 to the stationary portion 46 of body 14, thereby locking the door 44 in a closed position as shown in FIG. 1. It will be appreciated that an access opening can additionally, or alternatively, be at least partially defined by one or more other features of a vehicle.

The protected area 32 can be sized and configured to substantially or entirely surround one or more occupants (e.g., an operator or driver, and a passenger, each not shown) of the vehicle 10 during operation of the vehicle 10. It will be appreciated that, in one embodiment, seatbelt harnesses can be associated with one or more seats, and one or more restraint members, e.g., a hip bolster, can be provided to assist the roll cage for selectively restraining one or more operators within a vehicle.

Vehicle 10 can further include a net assembly 50 attached to the roll cage 30 and positioned on the left side of vehicle 10. The net assembly 50 is shown to include a net structure 52 and a plurality of net retention structures. The net structure 52 can selectively block at least a portion of the access opening 42. The vehicle 10 can also include a similar net assembly attached to the roll cage 30 and positioned on the right side of vehicle 10. In an alternative embodiment, however, it will be appreciated that a vehicle can be provided that might have a right-side net assembly that is substantially different than a left-side net assembly, and/or might include only a left-side net assembly or a right-side net assembly. It will also be appreciated that a net assembly can be provided in any of a variety of other locations and/or configurations for selectively blocking at least a portion of an access opening that communicates with a protected area on a vehicle.

Figure 2:
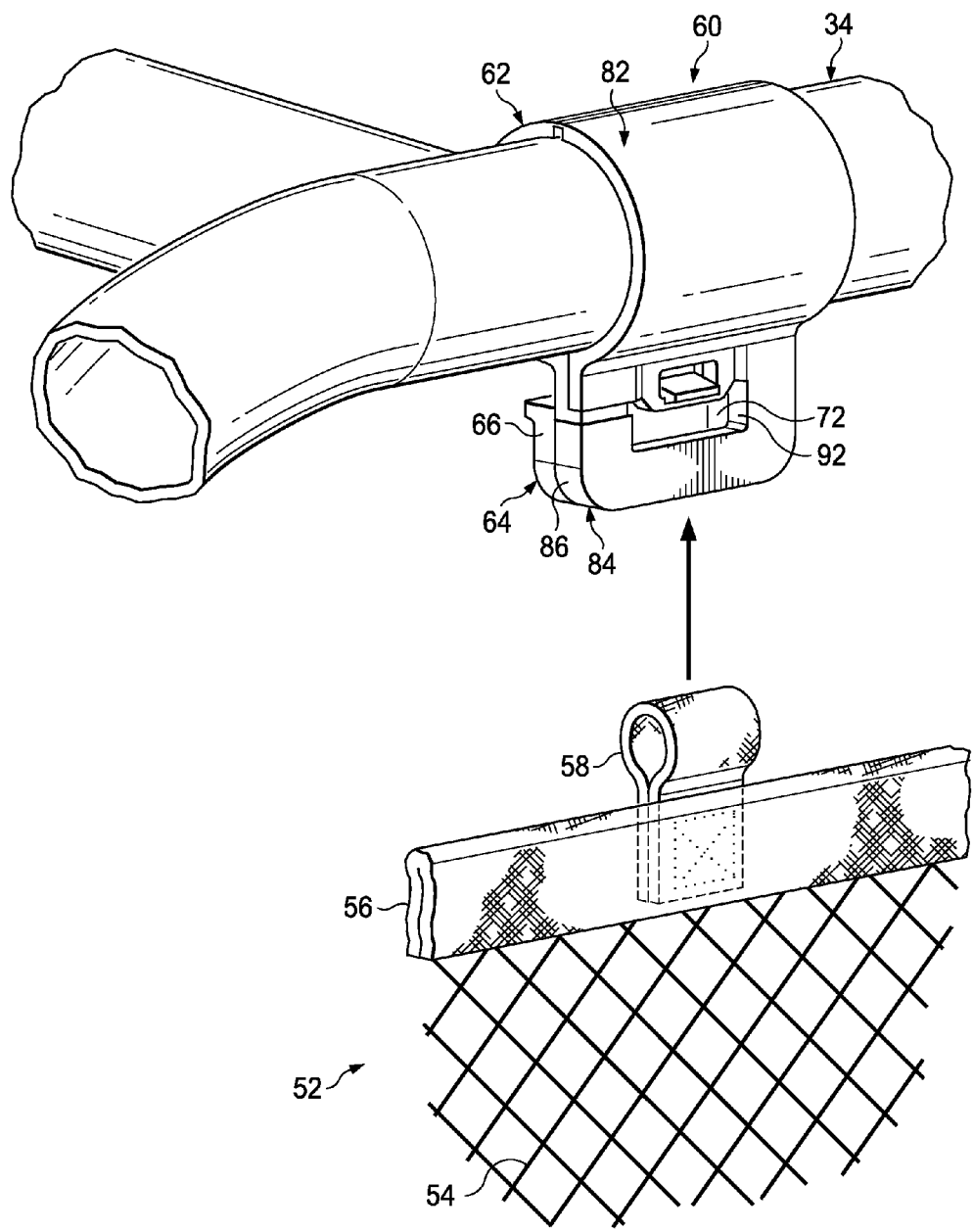
FIG. 2 is a top partially-exploded perspective view depicting a portion of a roll cage and the net assembly of the vehicle of FIG. 1.

Referring to FIGS. 1 and 2, the net structure 52 can include a mesh structure 54 and a reinforcement structure 56 that can be attached to the mesh structure 54. The mesh structure 54 and the reinforcement structure 56 can each be flexible such that the net structure 52 can be easily folded, bent or rolled-up for example. The net structure 52 can be selectively configurable in any one of a lowered, closed configuration, such as shown in FIG. 1, or any of a variety of available fully and partially open configurations. When the net structure 52 is in the lowered, closed configuration, the net structure 52 can at least inhibit passage of an operator through the access opening 42. For example, when the net structure 52 is in the lowered, closed configuration and the door 44 is in a closed position, as shown in FIG. 1, the net structure 52 can cooperate with the door 44 to substantially block the access opening 42, and thus prevent the arms and/or legs of an operator from leaving the protected area 32 during operation of the vehicle 10. For example, when both the net structure 52 and door 44 are in closed positions as shown in FIG. 1, the net structure 52 can prevent an operator's arms from leaving the protected area 32 through access opening 42 during operation of the vehicle 10, and the door 44 can prevent an operator's legs from leaving the protected area 32 through access opening 42 during operation of vehicle 10. It will be appreciated that, in other embodiments, a net structure might be used in any of a variety of other arrangements, with or without one or more associated doors, for substantially blocking an access opening to a protected area of a vehicle.

The mesh structure 54 can be formed from rope netting, web netting, fabric netting, screen, and/or any of a variety of other materials. In one embodiment, the mesh structure 54 can define a uniform arrangement of similarly-sized openings as shown in FIGS. 1 and 2. In one embodiment, these openings might each be small enough to prevent passage of an operator's hand through the opening. In another embodiment, these openings might each be small enough to prevent passage of an operator's finger through the opening. It will be appreciated that the mesh structure 54, when so configured, can nevertheless permit visibility by an operator through the mesh structure 54.

Although the reinforcement structure 56 can be flexible, the reinforcement structure 56 can be substantially resistant to stretching. For example, the reinforcement structure 56 can be formed from webbing, fabric, belting, wire, cable, and/or some other material, for example. In one embodiment, such as that shown in FIGS. 1 and 2, the reinforcement structure 56 might not facilitate visibility of an operator through the reinforcement structure 56 itself (e.g., such as when formed from nylon webbing), although in another embodiment, a reinforcement structure might be transparent (e.g., such as if formed from translucent PET material). The reinforcement structure 56 can be attached to the mesh structure 54 in any of a variety of suitable configurations to help ensure maintenance of the net structure 52 in a particular shape and/or configuration. In one embodiment, the reinforcement structure 56 can be attached to the mesh structure 54 about the entire perimeter of the mesh structure 54, as shown in FIG. 1. However, in other embodiments, only a portion of a perimeter of a mesh structure might be attached to a reinforcement structure. The reinforcement structure 56 can cooperate with the mesh structure 54 to ensure that the shape and size of the net structure 52, as well as the position of the net structure 52 with respect to the roll cage 30, remain substantially constant when the net structure 52 is in the lowered, closed configuration.

The vehicle 10 can include several net retention structures attached to a tubular member (e.g., 34) or other portion of a roll cage 30, for receiving attachment members of a net structure 52, to facilitate attachment of the net structure 52 to the roll cage 30. Attachment members of the net structure 52 can comprise straps (e.g., 58) configured to selectively engage a net retention structure. The straps (e.g., 58) can be configured as a loop (as in FIG. 2), can have a free end for receiving a D-ring, can be coupled with a male or female latch member, or otherwise.

Any of a variety of different types and combinations of net retention structures can be provided on a vehicle including, for example, stays, clips, and clampers. FIG. 2 illustrates a clamper 60 in accordance with one embodiment. In one embodiment, each of the net retention structures of the vehicle 10 can be provided by a clamper, as generally shown in FIG. 1. However, in alternative embodiments, one or more net retention structures of a vehicle can be provided by a clamper (e.g., 60), with other net retention structures of the vehicle being stays, clips, or otherwise.

Figure 3:
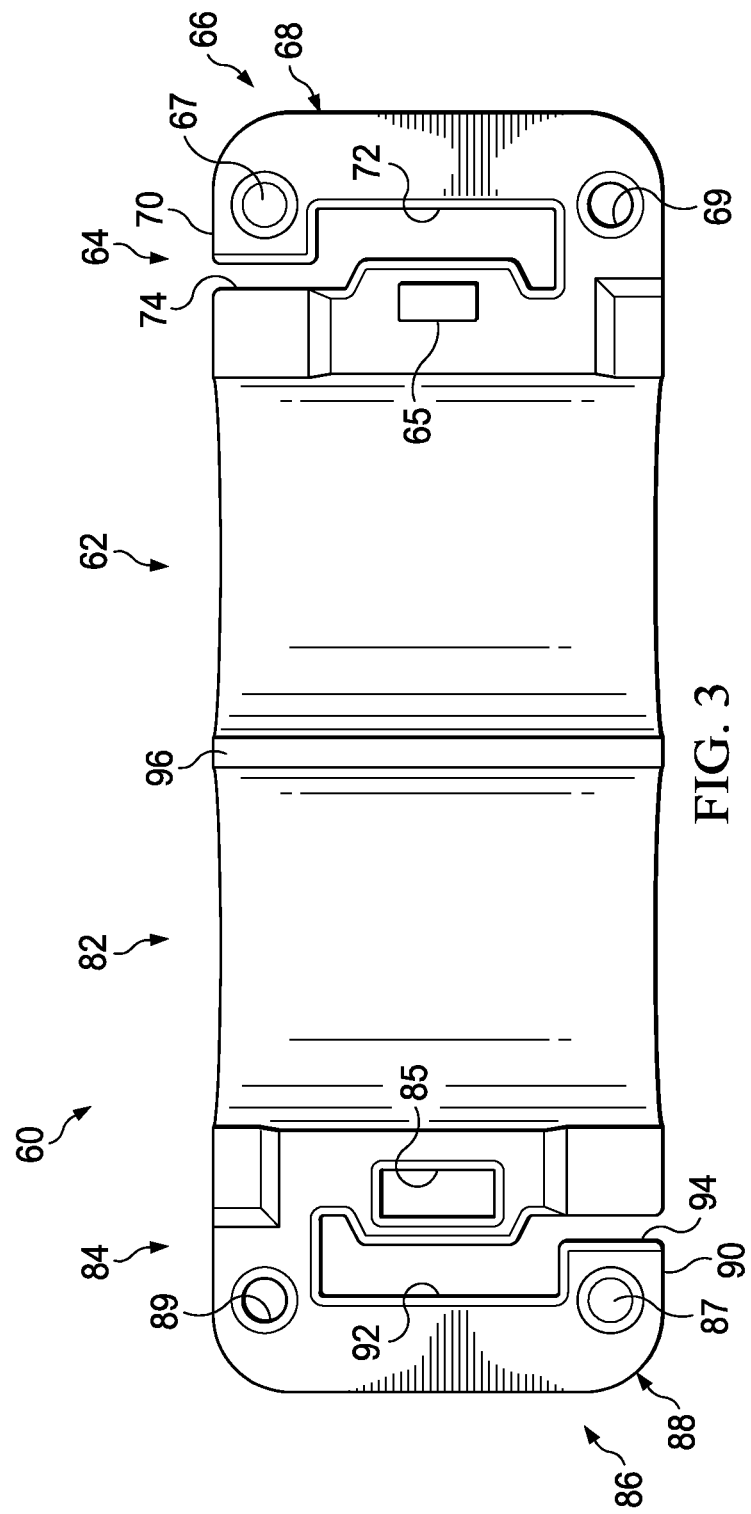
FIG. 3 is a top plan view depicting a clamper of the net assembly of FIG. 2 as removed from the roll cage of FIG. 2, and disassembled.
Figure 4:
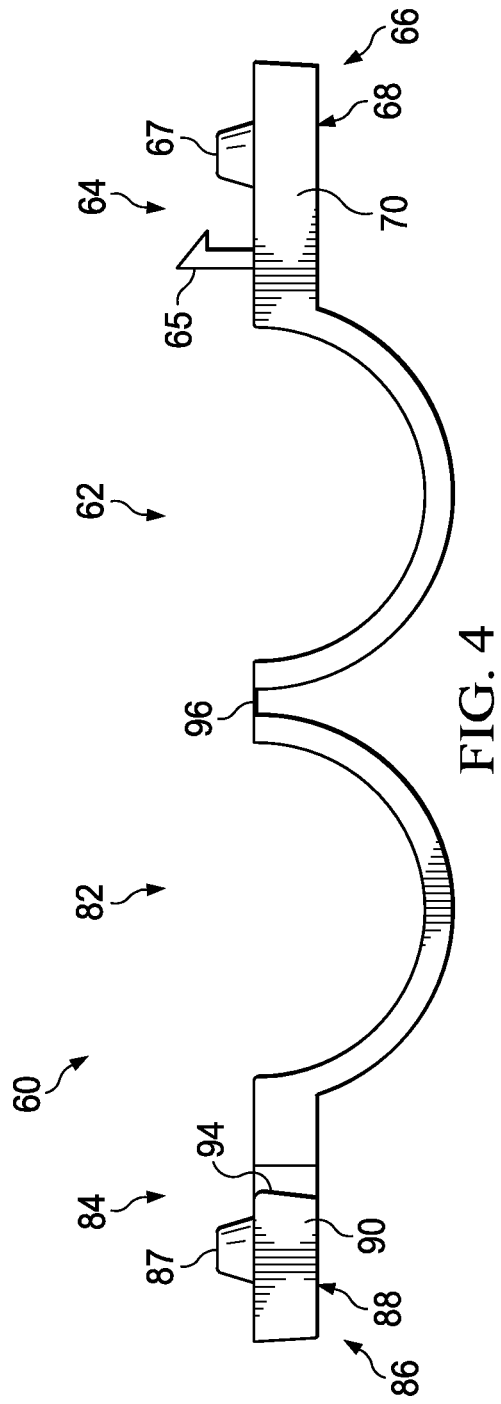
FIG. 4 is a side elevational view depicting the clamper of FIG. 3.

Referring now to FIGS. 2-4, the clamper 60 is shown to have a clam-shell type configuration, including opposing roll cage engagement portions. In the depicted embodiment, the tubular member 34 is shown to have a cylindrical outer surface, and the roll cage engagement portions of the clamper are shown to comprise arcuate portions 62, 82 having arcuate shapes to correspond with the cylindrical outer surface of the tubular member 34. In other embodiments in which a tubular member of a roll cage does not have a cylindrical outer surface, the roll cage engagement portions of a clamper can have a different shape (e.g., might not be arcuately-shaped) to correspond. The clamper can also include a living hinge 96 connecting the arcuate portions 62, 82.

The clamper 60 is additionally shown to include end portions 64, 84 extending away from the respective arcuate portions 62, 82. In one embodiment, the clamper 60, including the arcuate portions 62, 82, the living hinge 96, and the end portions 64, 84, can be integrally formed from as a unitary structure, e.g., from a polymeric material in an injection-molding process. However, it will be appreciated that a clamper can be formed from any of a variety of other suitable materials, and through any of variety of other suitable processes.

The end portions 64, 84 can selectively engage one another in face-to-face or confronting relationship, as shown in FIG. 2. For example, in one embodiment, the end portion 64 is shown to include a prong 65, and the end portion 84 is shown to define an interior aperture 85. In this configuration, the prong 65 enters the interior aperture 85 and engages the end portion 84, to facilitate engagement of the end portions 64, 84. In other embodiments, a clamper can include more than one such prong and corresponding interior aperture, or can include any of a variety of alternative mechanically interfacing structures.

The end portion 64 is also shown to include a protuberance 67 and a mount aperture 69 spaced from the protuberance 67. Similarly, the end portion 84 is shown to include a protuberance 87 and a mount aperture 89 spaced from the protuberance 87. When the end portions 64, 84 are engaged with one another, the mount aperture 69 can receive the protuberance 87, and the mount aperture 89 can receive the protuberance 67. These corresponding features can enhance the strength and structural rigidity of the clamper 60 when the end portions 64, 84 are engaged with one another.

In one embodiment, the end portions 64, 84 comprise respective buckle portions 66, 86 that are suitable for coupling with an attachment structure of a net structure. For example, the buckle portion 66 can include a frame 68 that has a perimeter edge 70. The frame 68 is shown to define a buckle aperture 72 and a slot 74. The slot 74 can communicate with the buckle aperture 72 and can extend through the perimeter edge 70 of the frame 68. Similarly, the buckle portion 86 can include a frame 88 that has a perimeter edge 90. The frame 88 is shown to define a buckle aperture 92 and a slot 94. The slot 94 can communicate with the buckle aperture 92 and can extend through the perimeter edge 90 of the frame 88.

In use, a disassembled clamper 60 (FIGS. 3-4) can be placed near the tubular member 34. The arcuate portions 62, 82 can then be moved relative one another about an axis of the living hinge 96, such that the end portions 64, 84 come into proximity one another. The loop defined by the strap 58 (FIG. 2) can then be weaved through the slots 74, 94 and into the buckle apertures 72, 92. The arcuate portions 62, 82 can be then be moved further relative one another about an axis of the living hinge 96, such that the end portions 64, 84 engage one another as described above. With the end portions 64, 84 engaged with one another, the slots 74, 94 in each one of the respective frames 68, 88 can be overlapped by non-slotted portions of the other respective frame 88, 68, as generally shown in FIG. 2. This misalignment of the slots 74, 94 can trap the loop of the strap 58 from leaving the buckle apertures 72, 92. In this configuration, with the end portions 64, 84 engaged with one another, the buckle apertures 72, 92 can be at least generally aligned with one another and can engage the strap 58 of the net structure 52, and the arcuate portions 62, 82 can cooperate with one another to at least substantially entirely surround the tubular member 34.

It will be appreciated that, in some instances, the clamper 60 can be fully attached to the tubular member 34 (with end portions 64, 84 engaged with one another), prior to engaging any attachment structure of the net structure 52 with the clamper 60. For example, if the attachment structure comprises a strap with a free end, the free end can be routed through the buckle apertures 72, 92 of the clamper 60 when fully assembled, and then secured such as with a D-ring.

Figure 5:
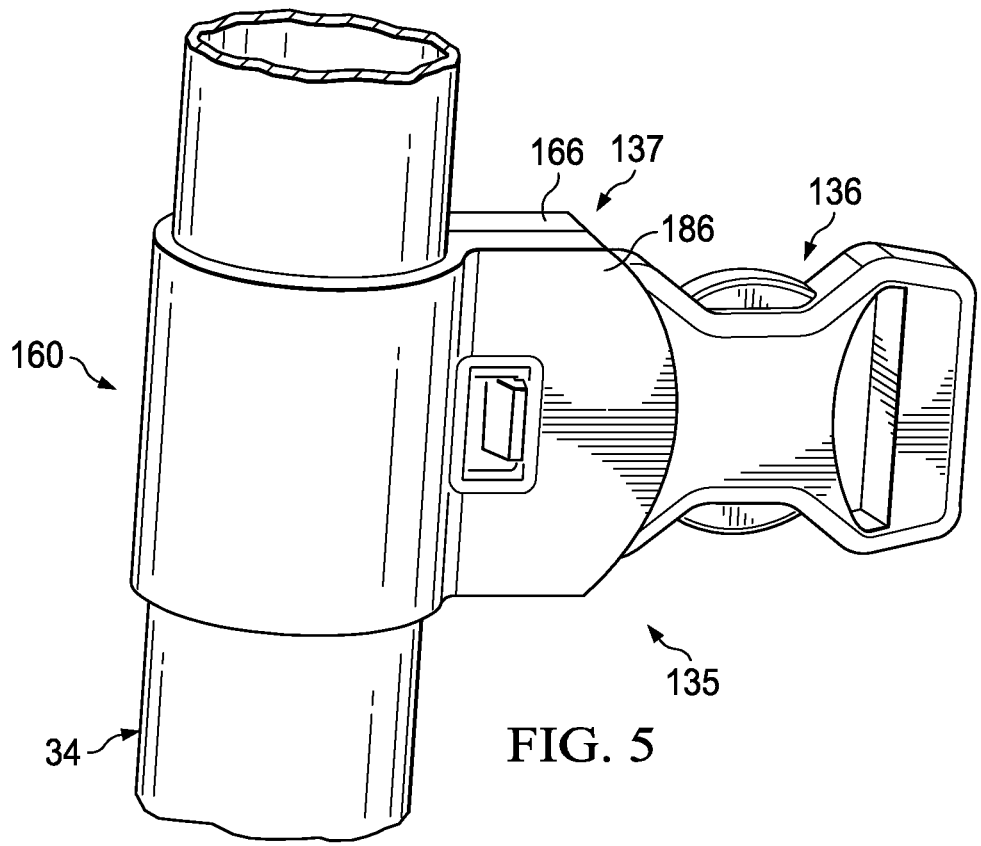
FIG. 5 is a perspective view depicting another clamper provided on a portion of the roll cage of the vehicle of FIG. 1.

It will be appreciated that an attachment structure can engage a clamper in any of a variety of other suitable configurations. For example, in one alternative configuration, such as shown in FIG. 5, a clamper 160 can include buckle portions 166, 186, one or both of which comprise a portion of a latch assembly 135. Other than with respect to the difference in the configuration of the buckle portions 166, 186, the clamper 160 can otherwise be similar to the clamper 60 discussed above. The latch assembly 135 can be provided for use by an operator in releasably attaching the net structure 52 to a lower, forward portion of the roll cage 30, and selectively locking the net structure 52 in the lowered, closed configuration shown in FIG. 1.

The latch assembly 135 can include interlocking portions 136, 137 that can be configured to selectively interlock with one another. The interlocking portion 136 can be part of an attachment structure of the net structure 52, and in one embodiment can be attached to the reinforcement structure 56 with a strap. In one embodiment, the interlocking portion 136 can be a male member that can include one or more flexible fingers. The interlocking portion 137 can be a female member defined by one or both of the buckle portions 166, 186 of the clamper 160, with the clamper 160 attached to a lower, forward portion of the roll cage 30. The interlocking portions 136, 137 can selectively engage one another in a snap fit arrangement that can releasably attach a lower portion of the net structure 52 to the roll cage 30, as shown in FIG. 1. The interlocking portion 136 can be disengaged, or detached, from the interlocking portion 137 by depressing the flexible fingers and withdrawing the interlocking portion 136 from the interlocking portion 137. Alternatively, it will be appreciated that the male and female members can be reversed, that the location of the interlocking portions relative to the roll cage 30 can be changed, and/or that mechanical interlocking arrangements having other configurations can be used.

Figure 6:
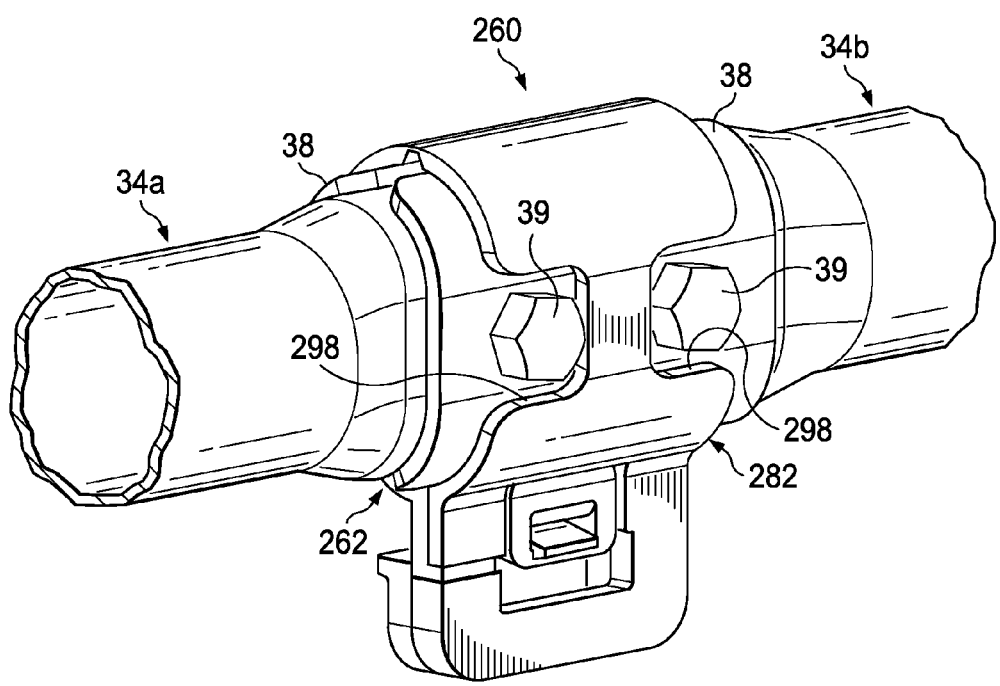
FIG. 6 is a perspective view depicting a clamper provided on a portion of a roll cage of a vehicle, in accordance with another embodiment.

In an alternative configuration, a clamper can be configured to attach to a roll cage or frame of a vehicle, at a location corresponding to a joint between or among respective members of the roll cage or frame of the vehicle. For example, FIG. 6 illustrates a clamper 260 attached to a roll cage of a vehicle, at a location where two tubular members 34a and 34b are shown to be joined together with plates 38 and bolts 39. An arcuate portion 282 of the clamper 260 is shown to define opposing notches 298 each for avoiding a respective one of the bolts 39 or other fasteners of the roll cage. Other than with respect to a difference in the specific shape defined by an arcuate portion 262 and the arcuate portion 282 of the clamper 260, the clamper 260 can otherwise be similar to the clamper 60 discussed above. In this configuration, the relative positions of the notches 298, the arcuate portion 282, and the bolts 39, can prevent undesired longitudinal movement of the clamper 260 relative to (i.e., along) the tubular members 34a and 34b. In addition, positioning of the clamper 260 over a joint in this manner, can obscure or enhance the aesthetic appearance of the joint.

Figure 7:
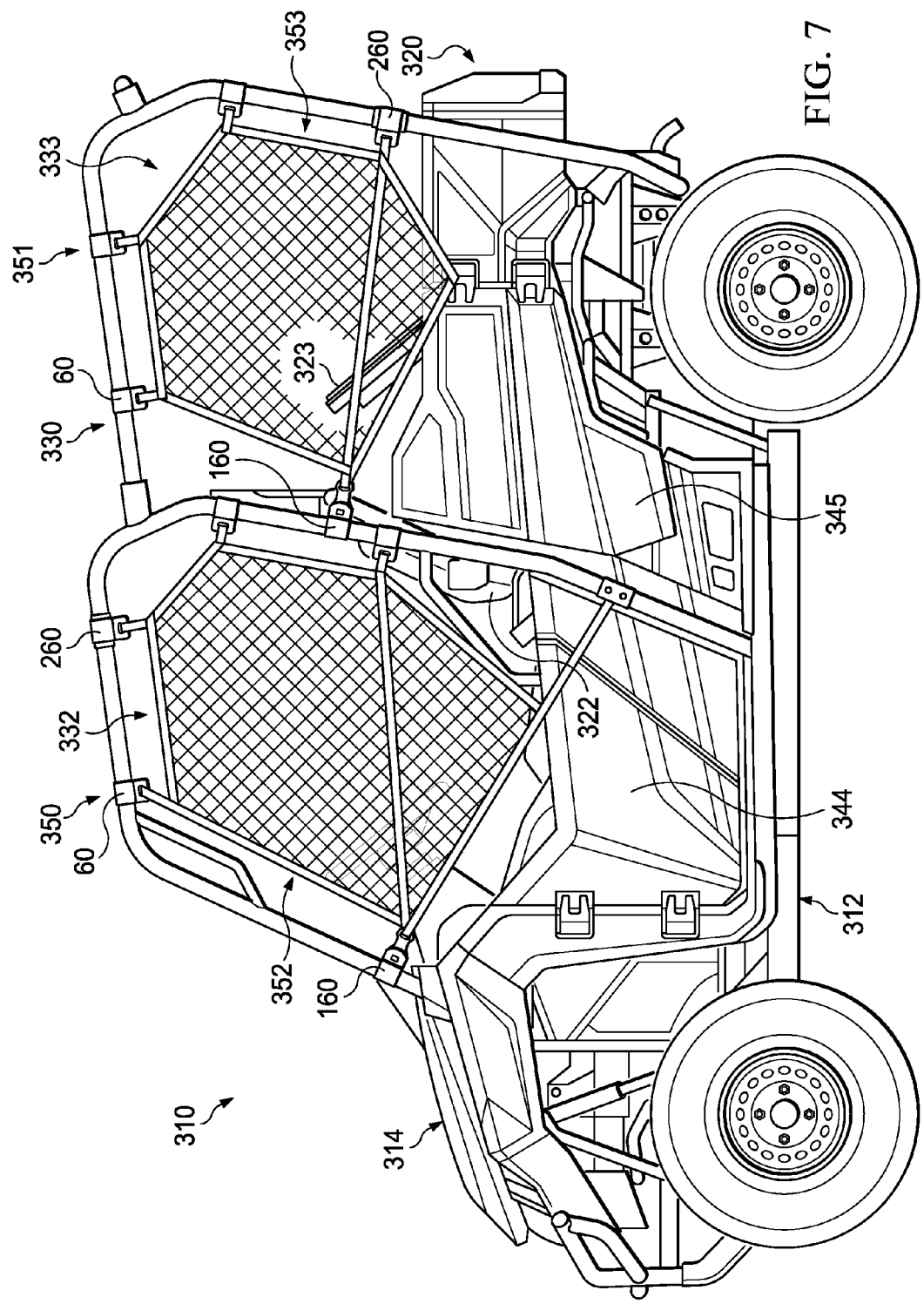
FIG. 7 is a perspective view depicting an MUV having front and rear net assemblies, in accordance with another embodiment.

FIG. 7 illustrates a vehicle 310 in accordance with another embodiment, which in many respects can be similar to the vehicle 10 described above. The vehicle 310 can include a roll cage 330 which can be attached to, and supported by, a frame 312 and/or body 314 of vehicle 310. The roll cage 330 can at least partially define a front protected area, indicated generally at 332, and a rear protected area, generally indicated at 333. At least one front seat 322 of the vehicle 310 can be positioned within the front protected area 332, such that an operator of vehicle 310 can be located within the front protected area 332 when seated upon front seat 322 during operation of vehicle 310. At least one rear seat (e.g., 323, shown partially folded) of the vehicle 310 can be positioned within the rear protected area 333, such that an operator of vehicle 310 can be located within the rear protected area 333 when seated upon rear seat 323 during operation of vehicle 310. In one embodiment, as shown in FIG. 7, the vehicle 310 can include a dump-type utility bed 320 that includes convertible rear seats, such as the rear seat 323. Front and rear doors 344 and 345 can facilitate selective access by operators to the front and rear protected areas 332 and 333, respectively.

Front and rear net assemblies 350 and 351 can be attached to the roll cage 330 on the left side of vehicle 310. The front net assembly 350 can include a net structure 352, and the rear net assembly 351 can include a net structure 353. The net structures 352 and 353 can each include a mesh structure and a reinforcement structure such as described above with respect to the net structure 52. Similar net assemblies can be provided on the right side of the vehicle.

The net structures 352 and 353 can each be selectively configurable in any one of a lowered, closed configuration, such as shown in FIG. 7, or any of a variety of available fully and partially open configurations. When the net structure 352 is in the lowered, closed configuration, the net structure 352 can cooperate with the front door 344 to at least inhibit passage of an operator from the front protected area 332. Likewise, when the net structure 353 is in the lowered, closed configuration, the net structure 353 can cooperate with the rear door 345 to at least inhibit passage of an operator from the rear protected area 333.

The front and rear net assemblies 350 and 351 can each additionally include several net retention structures attached to one or more tubular members or other portions of the roll cage 330, for receiving attachment members of the respective net structures 352 and 353, to facilitate attachment of the net structures 352 and 353 to the roll cage 330. The attachment members of the net structures 352 and 353 can comprise any of those described above with respect to the net structure 52, for example. Any of a variety of different types and combinations of net retention structures can be provided on a vehicle including, for example, stays, clips, and clampers. In one embodiment, the vehicle 310 can include one or more clampers, such as the clampers 60, 160, and 260 described above, examples of which are indicated as such in FIG. 7.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A clamper comprising:
   a first arcuate portion;
   a second arcuate portion;
   a living hinge, the living hinge connecting the first arcuate portion and the second arcuate portion;
   a first end portion extending away from the first arcuate portion, the first end portion comprising a first buckle portion; and
   a second end portion extending away from the second arcuate portion, the second end portion comprising a second buckle portion;
   wherein the first end portion and the second end portion are configured for engagement with one another in confronting relationship;
   one of the first end portion and the second end portion comprises a prong, and the other of the first end portion and the second end portion defines an interior aperture configured to matingly receive the prong;
   the first end portion comprises a first protuberance and defines a first mount aperture spaced from the first protuberance;
   the second end portion comprises a second protuberance and defines a second mount aperture spaced from the second protuberance; and
   the first mount aperture is configured to receive the second protuberance and the second mount aperture is configured to receive the first protuberance.

2. A clamper comprising:
   a first arcuate portion;
   a second arcuate portion;
   a living hinge, the living hinge connecting the first arcuate portion and the second arcuate portion;
   a first end portion extending away from the first arcuate portion, the first end portion comprising a first buckle portion; and a second end portion extending away from the second arcuate portion, the second end portion comprising a second buckle portion;

wherein the first end portion and the second end portion are configured for engagement with one another in confronting relationship;

one of the first end portion and the second end portion comprises a prong, and the other of the first end portion and the second end portion defines an interior aperture configured to matingly receive the prong;

the first buckle portion defines a first buckle aperture;

the second buckle portion defines a second buckle aperture; and the first buckle aperture is at least generally aligned with the second buckle aperture when the first end portion is engaged with the second end portion.

3. The clamper of claim 2, wherein:

the first buckle portion comprises a first frame, the first frame comprising a first perimeter edge and defining the first buckle aperture, the first frame further defining a first slot, the first slot communicating with the first buckle aperture and extending through the first perimeter edge of the first frame;

the second buckle portion comprises a second frame, the second frame comprising a second perimeter edge and defining the second buckle aperture, the second frame further defining a second slot, the second slot communicating with the second buckle aperture and extending through the second perimeter edge of the second frame; and the first slot is misaligned with the second slot when the first end portion is engaged with the second end portion.

4. The clamper of claim 3, wherein the first arcuate portion and the second arcuate portion are configured to cooperate with one another to at least substantially entirely surround a tubular member having a cylindrical outer surface.

5. The clamper of claim 4, wherein the first arcuate portion, the second arcuate portion, the living hinge, the first end portion, and the second end portion are integrally formed from a polymeric material as a unitary structure.

6. A clamper comprising:

a first arcuate portion;

a second arcuate portion;

a living hinge, the living hinge connecting the first arcuate portion and the second arcuate portion;

a first end portion extending away from the first arcuate portion, the first end portion comprising a first buckle portion; and a second end portion extending away from the second arcuate portion, the second end portion comprising a second buckle portion;

wherein the first end portion and the second end portion are configured for engagement with one another in confronting relationship; and the first arcuate portion defines first and second opposing notches each for avoiding a respective fastener of a roll cage of a vehicle.

7. The clamper of claim 6, wherein the first arcuate portion and the second arcuate portion are configured to cooperate with one another to at least substantially entirely surround a tubular member having a cylindrical outer surface.

8. The clamper of claim 7, wherein the first arcuate portion, the second arcuate portion, the living hinge, the first end portion, and the second end portion are integrally formed from a polymeric material as a unitary structure.

9. The clamper of claim 6, wherein at least one of the first buckle portion and the second buckle portion defines one of a male member and a female member of a buckle latch assembly.

10. A net assembly comprising:

a net structure comprising a mesh structure, a reinforcement structure attached to the mesh structure, and at least one attachment member attached to the reinforcement structure; and at least one clamper wherein, for each of the at least one clamper:

the clamper comprises a first arcuate portion, a second arcuate portion, a living hinge connecting the first arcuate portion and the second arcuate portion, a first end portion extending away from the first arcuate portion, and a second end portion extending away from the second arcuate portion;

the first end portion comprises a first buckle portion;

the second end portion comprises a second buckle portion; and the first end portion and the second end portion are configured for engagement with one another in confronting relationship and for engaging a respective one of the at least one attachment member.

11. The net assembly of claim 10 wherein, for each of the at least one clamper, one of the first end portion and the second end portion comprises a prong, and the other of the first end portion and the second end portion defines an interior aperture configured to matingly receive the prong.

12. The net assembly of claim 11 wherein, for each of the at least one clamper:

the first end portion comprises a first protuberance and defines a first mount aperture spaced from the first protuberance;

the second end portion comprises a second protuberance and defines a second mount aperture spaced from the second protuberance; and the first mount aperture is configured to receive the second protuberance and the second mount aperture is configured to receive the first protuberance.

13. The net assembly of claim 11 wherein, for each of the at least one clamper:

the first buckle portion comprises a first frame, the first frame comprising a first perimeter edge and defining a first buckle aperture, the first frame further defining a first slot, the first slot communicating with the first buckle aperture and extending through the first perimeter edge of the first frame;

the second buckle portion comprises a second frame, the second frame comprising a second perimeter edge and defining a second buckle aperture, the second frame further defining a second slot, the second slot communicating with the second buckle aperture and extending through the second perimeter edge of the second frame; and when the first end portion is engaged with the second end portion, the first slot is misaligned with the second slot and the first buckle aperture is at least generally aligned with the second buckle aperture to facilitate extension of the attachment member through each of the first buckle aperture and the second buckle aperture.

14. The net assembly of claim 10 wherein, for each of the at least one clamper, the first arcuate portion, the second arcuate portion, the living hinge, the first end portion, and the second end portion are integrally formed from a polymeric material as a unitary structure.

15. A vehicle comprising:
a seat configured to support an operator of the vehicle;
a roll cage at least partially defining a protected area and at least partially defining an access opening communicating with the protected area, the seat being positioned within the protected area, the roll cage comprising a tubular member;
a net structure comprising a mesh structure, a reinforcement structure attached to the mesh structure, and at least one attachment member attached to the reinforcement structure; and
at least one clamper attached to the tubular member wherein, for each of the at least one clamper:
the clamper comprises a first roll cage engagement portion, a second roll cage engagement portion, a living hinge connecting the first roll cage engagement portion and the second roll cage engagement portion, a first end portion extending away from the first roll cage engagement portion, and a second end portion extending away from the second roll cage engagement portion;
the first end portion comprises a first buckle portion;
the second end portion comprises a second buckle portion;
the first end portion and the second end portion are configured for engagement with one another in confronting relationship such that the first roll cage engagement portion and the second roll cage engagement portion cooperate with one another to at least substantially entirely surround the tubular member; and
the first buckle portion and the second buckle portion engage at least one of the at least one attachment member of the net structure;
wherein the net structure is selectively configurable in a closed configuration to at least inhibit passage of an operator of the vehicle through the access opening.

16. The vehicle of claim 15 wherein, for each of the at least one clamper:
the first roll cage engagement portion, the second roll cage engagement portion, the living hinge, the first end portion, and the second end portion are integrally formed from a polymeric material as a unitary structure;
one of the first end portion and the second end portion comprises a prong, and the other of the first end portion and the second end portion defines an interior aperture configured to matingly receive the prong;
the first end portion comprises a first protuberance and defines a first mount aperture spaced from the first protuberance;
the second end portion comprises a second protuberance and defines a second mount aperture spaced from the second protuberance; and
the first mount aperture is configured to receive the second protuberance and the second mount aperture is configured to receive the first protuberance.

17. The vehicle of claim 16 wherein, for each of the at least one clamper:
the first buckle portion comprises a first frame, the first frame comprising a first perimeter edge and defining a first buckle aperture, the first frame further defining a first slot, the first slot communicating with the first buckle aperture and extending through the first perimeter edge of the first frame;
the second buckle portion comprises a second frame, the second frame comprising a second perimeter edge and defining a second buckle aperture, the second frame further defining a second slot, the second slot communicating with the second buckle aperture and extending through the second perimeter edge of the second frame; and
when the first end portion is engaged with the second end portion, the first slot is misaligned with the second slot and the first buckle aperture is at least generally aligned with the second buckle aperture to facilitate extension of the attachment member through each of the first buckle aperture and the second buckle aperture.

18. The vehicle of claim 15 wherein the tubular member of the roll cage has a cylindrical outer surface, the first roll cage engagement portion has an arcuate shape, and the second roll cage engagement portion has an arcuate shape.

* * * * *